United States Patent [19]

DeRosa

[11] 4,419,051
[45] Dec. 6, 1983

[54] TWIN TENSION/TORSION BEAM ROTOR SYSTEM

[75] Inventor: Richard T. DeRosa, Brookhaven, Pa.

[73] Assignee: The Boeing Company, Seattle, Wash.

[21] Appl. No.: 348,889

[22] Filed: Feb. 16, 1982

[51] Int. Cl.³ .............................................. B64C 27/38
[52] U.S. Cl. ..................................... 416/140; 416/141
[58] Field of Search .......... 416/134 A, 138 A, 140 A, 416/141

[56] References Cited

U.S. PATENT DOCUMENTS

| | | | |
|---|---|---|---|
| 3,282,350 | 11/1966 | Kisovec | 416/140 A X |
| 3,533,713 | 10/1970 | Salmun | 416/140 A |
| 3,591,310 | 7/1971 | Mouille | 416/140 A X |
| 3,893,788 | 7/1975 | Ditlinger | 416/134 A |
| 4,111,605 | 9/1978 | Roman et al. | 416/141 |
| 4,201,515 | 5/1980 | Derschmidt et al. | 416/134 A |
| 4,242,048 | 12/1980 | McArdle | 416/134 A |
| 4,266,912 | 5/1981 | Roman | 416/141 |
| 4,344,739 | 8/1982 | Derschmidt et al. | 416/141 |
| 4,349,317 | 9/1982 | Desjardins | 416/134 A |
| 4,369,019 | 1/1983 | Lovera et al. | 416/134 A |

Primary Examiner—Everette A. Powell, Jr.
Attorney, Agent, or Firm—Jones, Tullar & Cooper

[57] ABSTRACT

A rotor system for a helicopter including a tension/torsion component which is fabricated from composite material and as a compound curved, continuous loop twin tension/torsion beam. Each end of the twin tension/torsion beam includes two curved (wrapped) ends which are oriented substantially orthogonally. At one end the curved ends extend about the flap hinge, and at the other end the curved ends extend about the fold and lead/lag hinge of the rotor system. To accommodate the twin tension/torsion beam at the flap hinge a support fitting is provided with lugs which are made compatible with the rotor hub lugs, and to accommodate the twin tension/torsion beam at the fold and lead/lag hinge a pitch varying structure is provided with twin beam engaging clevis surfaces.

14 Claims, 7 Drawing Figures

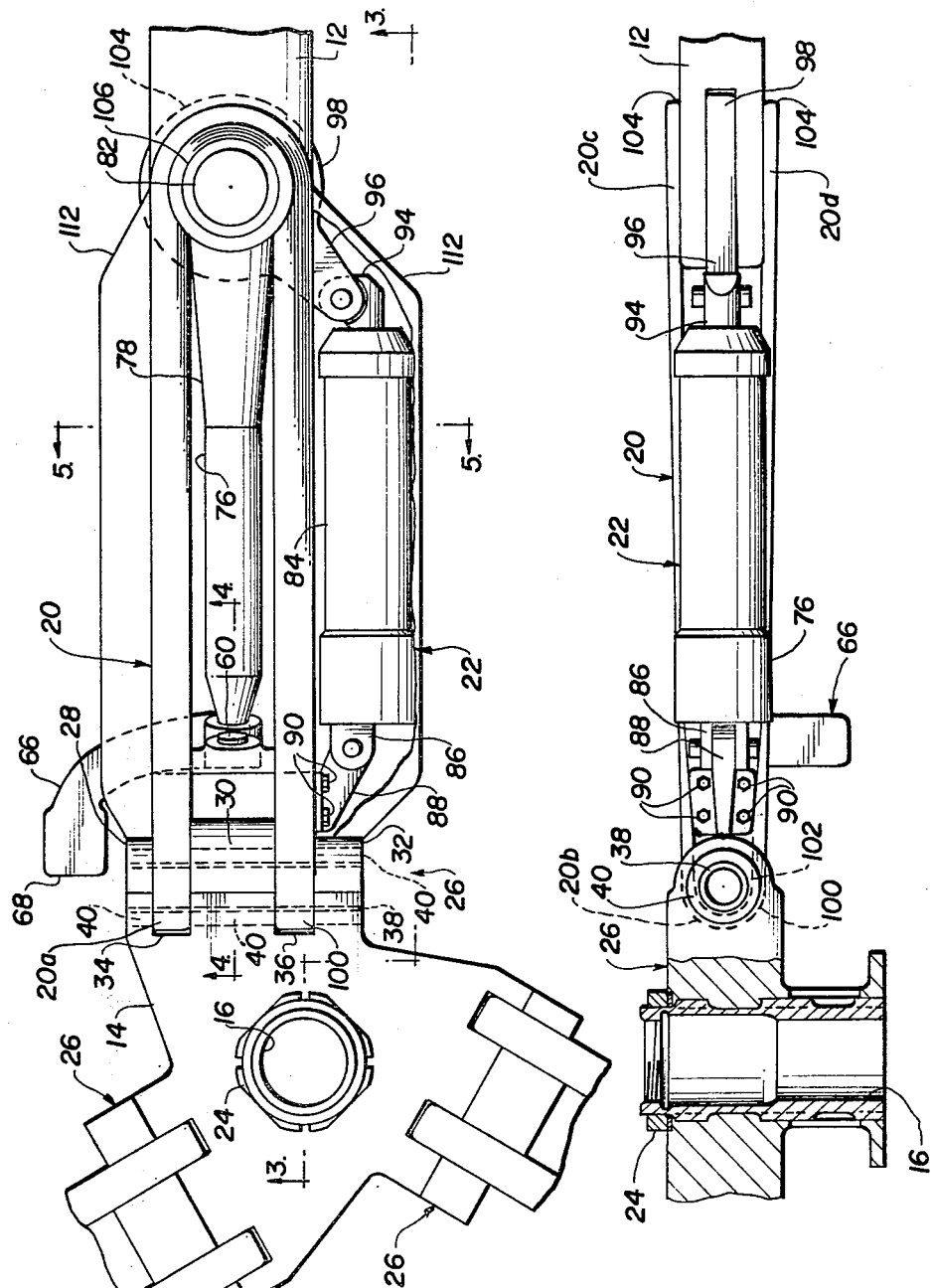

TWIN TENSION/TORSION BEAM ROTOR SYSTEM

BACKGROUND OF THE INVENTION

1. Field of the Invention

The present invention is directed generally to a rotor system for a helicopter. More particularly, the present invention is directed to a rotor system having elastomeric flap and lead-lag bearings and a curved, continuous loop twin composite tension/torsion beam. The rotor system is also distinguished in that pitch bearings are eliminated.

2. Prior Art

The blade mounting and support system in a rotary blade aircraft such as a helicopter is conventionally a very complex and complicated mechanism. For example, in the fully articulated rotor blade, the blade is required to move in several different but related paths during its operation and a separate bearing assembly has been required for each motion. The blades flap about a horizontal axis with respect to the rotor blade to either cone or droop. They also twist or rotate about their own longitudinal axis as the blade pitch is changed. Additionally, the flapping and air drag caused as the blade rotates result in blade lead or lag motions wherein the blade moves slightly in the horizontal plane about a vertical axis at the blade attachment.

In prior art blade mounting and attachment schemes, a number of lubricated bearings have been required to provide for movement of the blade through the various motions it must perform. Lead/lag bearings, flap bearings, pitch bearings, and fixed end torsion/tension straps have been conventionally used to mount the blade to the rotor. Each of these bearings requiring lubrication has a lubricating oil reservoir and flow lines associated with it. As the helicopter operates, these bearings wear, seals leak, the oil reservoirs need to be replenished, lines clog, and other problems arise. The maintenance of such a system is a time consuming and tedious chore which must be performed at relatively frequent intervals to ensure safe operation.

In many of the prior rotor systems heavy steel and aluminum forgings for housing the above described lubricated roller or ball bearings are used. The overall size of the rotor hub system is affected by the size requirements of these bearings and lubricant reservoirs thus adding to the hub cross-sectional area and parasite drag. The more parasite drag, the more power which is required to overcome it and the less power available to move the aircraft.

The tension/torsion member in the prior art devices may be made of laminates of steel which permit torsion flexure while carrying centrifugal force from the blade attachment housing to the rotor hub. Again, this structure has added weight, size and drag to permit as great a degree of blade pitch motion as is desirable. The tension/torsion member connection points are subjected to high stress and require periodic inspection.

Thus, the prior art rotor hub and blade mounting assemblies are complex and heavy and require frequent maintenance, and inspection and have a large amount of parasite drag.

OBJECTS AND SUMMARY OF THE INVENTION

It is an object of the present invention to provide a low drag rotor hub for a helicopter.

A further object of the present invention is to provide a rotor hub system having no lubricant requiring bearings.

Still another object of the present invention is to provide a rotor hub assembly using a twin composite beam to carry the rotor centrifugal force.

Still another object is to eliminate pitch change bearings.

Still a further object of the present invention is to provide a rotor hub system utilizing elastomeric flap hinge bearings, and elastomeric lead-lag bearings.

As will be set forth in greater detail in the description of a preferred embodiment as set forth hereinafter, the twin beam rotor system in accordance with the present invention includes a compound curved, continuous loop composite twin tension/torsion beam to carry the rotor centrifugal force. The inboard ends of the twin tension/torsion beam curves in a vertical plane and passes around the flap hinge which includes a hinge pin whose axis is generally horizontal. The twin beam extends radially outwardly from the rotor and curves in a horizontal plane about a vertical hinge pin which defines the lead-lag blade and fold axis.

This twin beam rotor system duplicates the required articulation provided by the prior art metal hub arrangements. The compound curved, continuous loop composite twin tension/torsion beam permits blade pitching motion by flexure of the beam material and eliminated the need for pitch bearings. The elimination of these pitch bearings and their associated housings substantially reduces hub size and parasite drag.

The flap bearings, lead/lag, fold, and pitch arm bearings are dry bearings which require no lubrication. This substitution of bearing structures again reduces housing size and hence drag, and also reduces maintenance requirements thereby increasing the operating time between servicing.

The twin beam rotor hub system in accordance with the present invention reduces hub profile and parasite drag by 50% when compared to prior structures. In addition, the laminated bearings and the elimination of the pitch bearings increases reliability by eliminating servicing and maintenance problems such as oil leaks and seal failures. The composite twin beam replaces the laminated steel centrifugal force pack thereby adding durability and dependability while contributing to an overall reduction in weight and enhancing serviceability. Finally, the simplicity of design of the twin beam rotor system in accordance with the present invention greatly reduces the total number of parts with an attendant reduction in complexity.

BRIEF DESCRIPTION OF THE DRAWINGS

While the novel feature of the twin beam rotor system, in accordance with the present invention, are set forth with particularity in the appended claims, a full and complete understanding of the invention may be had by referring to the detailed description of a preferred embodiment as set forth hereinafter and as may be seen in the accompanying drawings in which:

FIG. 2 is a top plan view of the twin beam rotor system in accordance with the present invention with portions removed for clarity;

FIG. 3 is a side elevation view of the twin beam rotor system taken along line 3—3 in FIG. 2;

DESCRIPTION OF A PREFERRED EMBODIMENT

Figure 1:
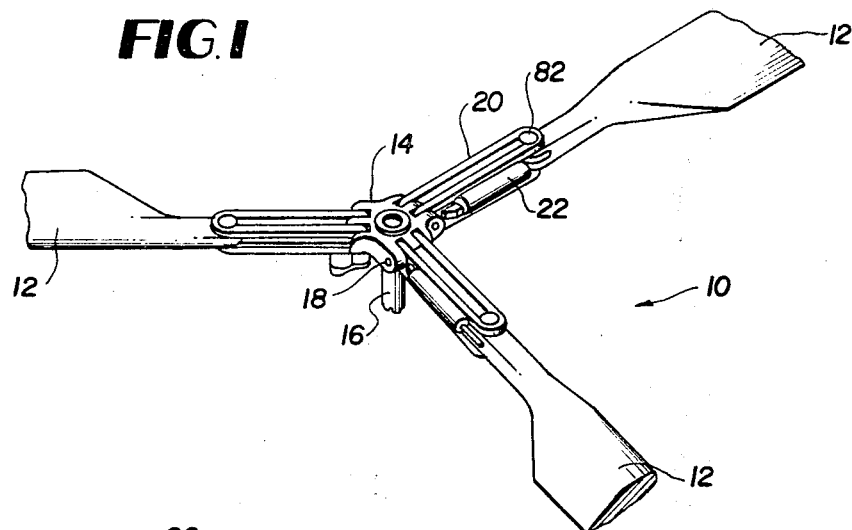
FIG. 1 is a schematic perspective view of the twin beam rotor system generally in accordance with the present invention with portions removed for clarity.

Turning initially to FIG. 1, there may be seen generally at 10, a preferred embodiment of a twin beam rotor system in accordance with the present invention as applied to a three-bladed helicopter.

As may be seen in FIG. 1, three blades 12 are secured to a central rotor hub 14 for rotation therewith when hub 14 is driven by a suitable drive shaft 16 that is caused to rotate by the helicopter's engine(s). Each blade 12 is secured to the rotor hub 14 generally by a horizontal flap hinge 18 that is carried by the rotor hub 14, and by a twin beam tension/torsion member 20, in accordance with the present invention. Each blade also has a suitable fold actuator and lead/lag absorber 22 as is generally known in the art. In operation, the blades 12 are caused to rotate by shaft 16 and undergo a number of motions in different directions, as is known in the art. The twin beam rotor system, as will be discussed in detail, allows for these complex and complicated movements of each blade during its revolutions in a manner and with a reduction of drag, parts, and maintenance unknown in prior rotor systems.

Turning now to FIGS. 2 and 3, a twin beam rotor system for one blade 12 in accordance with the present invention may be seen in detail. Rotor hub 14 is carried by the drive shaft 16 and is secured thereto by a hub nut 24 in a conventional manner. Hub 14 is a generally flat member and, in the preferred embodiment is provided with three sets of spaced mounting lugs. These three sets of mounting lugs 26 are identical and are spaced evenly around hub 14. Each set 26 has three spaced, outwardly extending lugs 28, 30 and 32 with interstices 34 and 36 being provided as the spaces between the spaced lugs 28, 30 and 30, 32; respectively. These three lugs 28, 30 and 32 are formed with cooperating apertures which receive a flap hinge pin 38 that is surrounded by an elastomeric flap bearing 40. While flap hinge pin 38 extends through the lugs 28, 30 and 32 and also through interstices 34 and 36, it should be noted that elastomeric flap bearing 40 is carried only with the lugs 28, 30 and 32 to surround the portions of the flap hinge pin 38 within the lugs. Elastomeric flap bearing 40 is of a known material and is comprised generally of a multi-layer laminate of rubber and metal layers which require no lubrication. Flap hinge pin 38 is shown as being hollow and is made of suitable metal having the necessary strength while remaining as light as possible.

Figure 6:
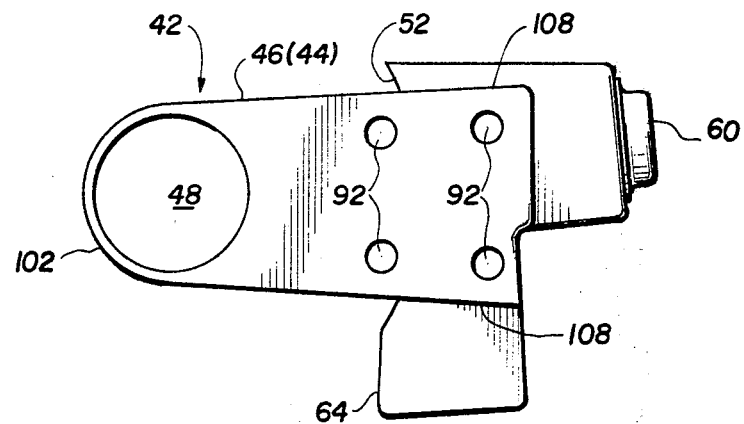
FIG. 6 is a side elevation view of the twin beam inboard support fitting of the present invention.
Figure 7:
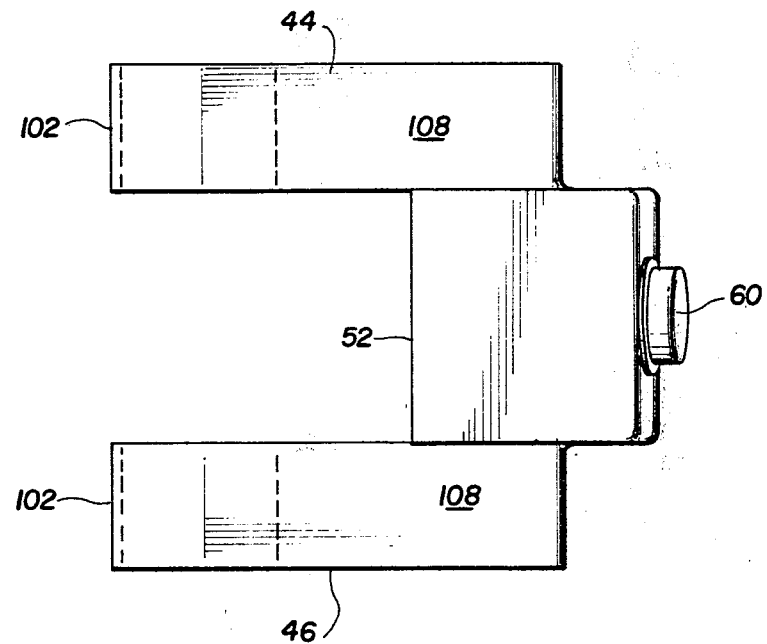
FIG. 7 is a top plan view of the support fitting of FIG. 6.

A twin beam support fitting, generally at 42, which cooperates with each set of mounting lugs 26 to form flap hinge 18 may be seen most clearly in FIGS. 6 and 7. Support fitting 42 has a pair of inwardly extending lugs 44 and 46 which are received in interstices 34 and 36, respectively. Each lug 44 and 46 has an aperture 48 at its inboard end through which flap hinge pin 38 passes. Aperture 48 in each lug 44 and 46 is sized to receive the flap hinge pin 38 but not elastomeric flap bearing 40.

Figure 4:
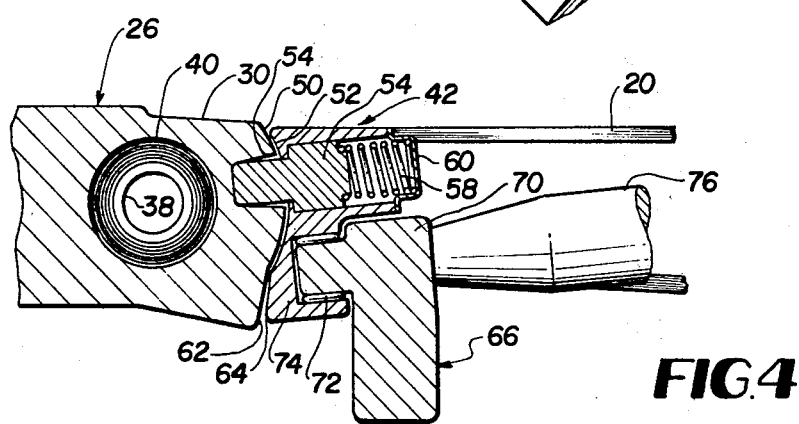
FIG. 4 is a side elevation view of the flap hinge and pitch tube bearing of the twin beam rotor system in accordance with the present invention taken along line 4—4 of FIG. 2.

As may be seen most clearly in FIG. 4, center lug 30 of each set 26 has a convex outer end surface 50 which is compatible and cooperates with a concave inner surface 52 of fitting 42 between the inwardly extending lugs 44 and 46. These two surfaces cooperate to form a joint about which blade 12 flaps or pivots upwardly and downwardly during operation. The horizontal axis of flap hinge pin 38 is the center of rotation of the flapping motion. A centrifugal force actuated droop stop pin 54 is carried by fitting 42, as may be seen most clearly in FIG. 4. Pin 54 is cylindrical and is received in a suitable bore 56 in the lug 30. The bore 56 opens into convex surface 50. When the helicopter is at rest, pin 54 holds the blades 12 generally horizontal. During operation, as the hub 14 and blades 12 are rotated, centrifugal force causes pin 54 to move radially outwardly against a coiled spring 58 which is held in by a cover plate 60 to a point where the pin 54 is moved out of the bore 56 thereby allowing the blades 12 to flap about the horizontal axis of flap hinge pin 38. The lower, outer portion 62 of convex surface 50 of lug 30 and the lower inner portion 64 of concave surface 52 of support sleeve 42 are generally flat and are spaced from each other to provide an in-flight droop stop for blade 12 with respect to hub 14.

The pitch of blade 12 is controlled by a pitch arm, generally at 66 in FIGS. 2, 3, 4 and 5. Pitch arm 66 has a first end 68 which is connected by a pitch link (not shown) to a swashplate (not shown) in a known manner to cause pitch arm 66 to rotate about a second end 70 which, as may be seen in FIG. 4, is carried by a dry bearing 72 that fits in a bearing receptacle 74 in the lower outboard portion of twin beam support fitting 42. Dry bearing 72 is, in the preferred embodiment, a metal sleeve which is covered with a Teflon impregnated fabric. Rotation of pitch arm 66 by the swashplate is transmitted through a torque tube 76 to a pitch clevis 78 that may be seen most clearly in FIG. 2. Pitch clevis 78, in turn, when rotated by torque tube 76, causes the pitch of blade 12 to change in a known manner.

A fold actuator and lead/lag absorber, generally at 22 is also provided and may be seen most clearly in FIGS. 2 and 3. Folding of blade 12 about a fold pin 82 having a vertical axis such as is desirable during storage of the helicopter, is accomplished by a hydraulic cylinder 84 which comprises part of fold actuator and lead/lag absorber 22. Hydraulic cylinder 84 is pivotably secured at a first inboard end 86 to a mounting plate 88 that is bolted to the trailing side of support fitting 42 by four spaced bolts 90 which are threadably secured in threaded holes 92 drilled in the trailing side of twin beam support fitting 42, as shown in FIG. 6. The outboard end 94 of hydraulic cylinder 84 is secured to an actuator arm 96 portion of a blade fold ring 98 which is operatively connected to blade 12 whereby extension of cylinder 84 causes blade 12 to pivot in a generally horizontal plane about fold pin 82. When the helicopter is in operation, the hydraulic cylinder 84 serves as a lead/lag absorber to take up the slight horizontal (in plane) movements of blade 12 which are caused by acceleration and deceleration and air frictional forces on the blade as it rotates.

Figure 5:
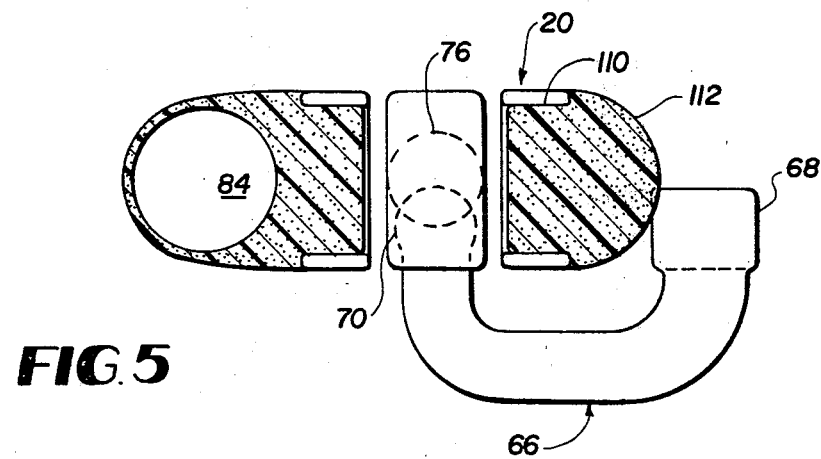
FIG. 5 is a cross sectional view through the twin beam rotor system in accordance with the present invention taken along line 5—5 of FIG. 2.

As each blade rotates and goes through the various flap, pitch, and lead/lag motions as described above, suitable bearings have, in the prior art, been required to handle these complex motions. As noted previously, the twin beam rotor system in accordance with the present invention provides for these motions by a double wrap composite beam, generally at 20, as may be seen in FIGS. 1–5. Double wrap composite twin beam 20 is a compoundly curved, continuous loop beam of a flexible material such as unidirectional glass fiber strands, Kevlar or graphite which may be held together by a suitable binder (resin matrix). As may be seen most clearly in FIGS. 2 and 3, twin beam 20 is double wrapped (20a, 20b) as its inboard ends 100 around spaced thin walled circular-segment portions 102 of lugs 44 and 46 of twin beam support fitting 42 and is double wrapped (20c 20d) at its outboard ends 104 about suitable circular-segment channels 106 in the outboard end of the pitch clevis 78. At its inboard ends 100, the double wrap of twin composite beam 20 passes through interstices 34 and 36 as it wraps around the thin walled circular-segment portions 102 of the inwardly extending lugs 44 and 46 of twin beam support fitting 42. The twin beam 20 extends between its wrapped ends, along channels 108 of the lugs 44 and 46 and channels 110 in fairing 112 (FIG. 5). The double wrapped ends 20a, 20b are oriented substantially orthogonally to the double wrapped ends 20c, 20d.

Thus, for example, as blade 12 flaps during flight, the flapping motion is carried out about flap hinge pin 38 through bearings 40. As blade 12 pitches, the twin beam will twist in torsion. Further, when the blade leads or lags about vertical pin 82, motion is dampened through absorber 22, and reacted through the support fitting 42. Since all of these various blade motions will usually occur simultaneously and further since they change as the blade rotates through one revolution, the double wrap twin composite beam 20 will be continuously in motion. However, by proper selection of the materials used for twin beam 20, these motions to which beam 20 is subjected during rotation of blade 12 will have no adverse effects on the beam.

The double wrap twin composite beam 20 in combination with the horizontal flap hinge pin 38 and its elastomeric bearing 40 together with the pitch arm 66 and its dry bearing 72, as was previously discussed, results in a rotor hub system which does not use conventional rolling elements and lubricant. This structure thereby substantially improves the durability and reliability of the rotor hub system while at the same time providing a substantial reduction in weight and parasite drag since the components have a significantly lower weight than prior roller bearings, oil reservoirs and attendant housings and further since the housings are drastically smaller in size.

While a preferred embodiment of a twin beam rotor system in accordance with the present invention has been fully and completely described hereinabove, it will be obvious to one of ordinary skill in the art that a number of changes, in for example, the specific bearing materials, the specific materials used to form the double wrap twin beam, the number of blades, the specific structure of the lead/lag absorber and the like could be made without departing from the true spirit and scope of the present invention and that accordingly the invention is to be limited by the following claims.

What is claimed is:

1. A rotor system for mounting rotor blades to a helicopter, comprising:
    a rotor hub having at least two sets of mounting lugs, each set including a plurality of adjacent lugs each containing an aperture;
    a support fitting for each set of mounting lugs, each said support fitting including a plurality of adjacent lugs each containing an aperture,
    each set of mounting lugs and the lugs of a respective support fitting being engaged such that their respective apertures are aligned to receive a hinge pin forming thereby a flap hinge;
    a plurality of elongated blade pitch varying means each connected at one end to a respective support fitting, and each defining a clevis for receiving a rotor blade securing pin forming thereby a fold hinge; and
    a compound curved, continuous loop twin tension/torsion beam, double wrapped around the flap hinge at one end and double wrapped around the fold hinge.

2. The rotor system as defined in claim 1, wherein:
    (i) one lug of each set of mounting lugs includes a bore and an outer surface in which the bore opens, said outer surface having a generally convex portion; and
    (ii) each support fitting includes an outer surface between two adjacent lugs which has a generally concave portion and which is compatible with said generally convex portion both the convex portion and the concave portion cooperate to form a joint having as its center of rotation the center axis of said hinge pin.

3. The rotor system as defined in claim 2, further comprising:
    a centrifugal force actuated droop stop pin carried by each support fitting, and biasing means for biasing the droop stop pin into said bore.

4. The rotor system as defined in claim 2, wherein:
    (iii) the outer surface of said one lug included a generally flat portion which is joined with the generally convex portion, and said outer surface of the support fitting includes a generally flat portion which is joined with the generally concave portion, both generally flat portions serving as an in-flight droop stop.

5. The rotor system as defined in claim 1, wherein:
    (i) each support fitting includes two adjacent lugs each having a curved-segment thin-walled portion about its aperture which engages the tension/torsion beam, thereby producing said double wrapped condition of the tension/torsion beam around the flap hinge; and
    (ii) the clevis of each of the elongated blade pitch varying means includes two spaced curved-segment portions which engage the tension/torsion beam, thereby producing said double wrapped condition of the tension/torsion beam around the fold hinge.

6. The rotor system as defined in claim 5, further comprising:
    a fairing having parallel extending upper and lower channels which receive the tension/torsion beam between its wrapped ends.

7. The rotor system as defined in claim 6, wherein:
    (iii) said two adjacent lugs each further has an upper and lower channel extending from the curved-segment thin-walled portion, and oriented to align with the upper and lower channels in the fairing.

8. The rotor system as defined in claim 7, wherein:
(iv) the curved-segment portions of said two adjacent lugs are oriented substantially orthogonally to the curved-segment portions of said clevis.

9. The rotor system as defined in claim 1, wherein:
(i) each support fitting includes a receptacle; and
(ii) the elongated blade pitch varying means includes a pitch arm rotatably supported by a dry bearing positioned in said receptacle.

10. The rotor system as defined in claim 9, wherein:
(iii) the elongated blade pitch varying means further includes a torque tube connected to the pitch arm and said clevis for transmitting pitch arm motion to said clevis.

11. The rotor system as defined in claim 1, wherein:
(i) the tension/torsion beam is fabricated from predominately unidirectional glass fiber strands.

12. The rotor system as defined in claim 1, wherein:
(i) the hinge pin is surrounded by an elastomeric bearing in each lug of said plurality of adjacent lugs of each set of mounting lugs.

13. The rotor system as defined in claim 1, further comprising:
a fold actuator and lead/lag absorber connected to the support fitting and to said fold hinge.

14. The rotor system as defined in claim 13, wherein:
(i) the fold actuator and lead/lag absorber comprises a hydraulic piston and cylinder.

* * * * *